July 6, 1937.  L. P. RANKIN  2,086,434
GLOW DISCHARGE TREATMENT OF ROSIN
Filed Jan. 9, 1932
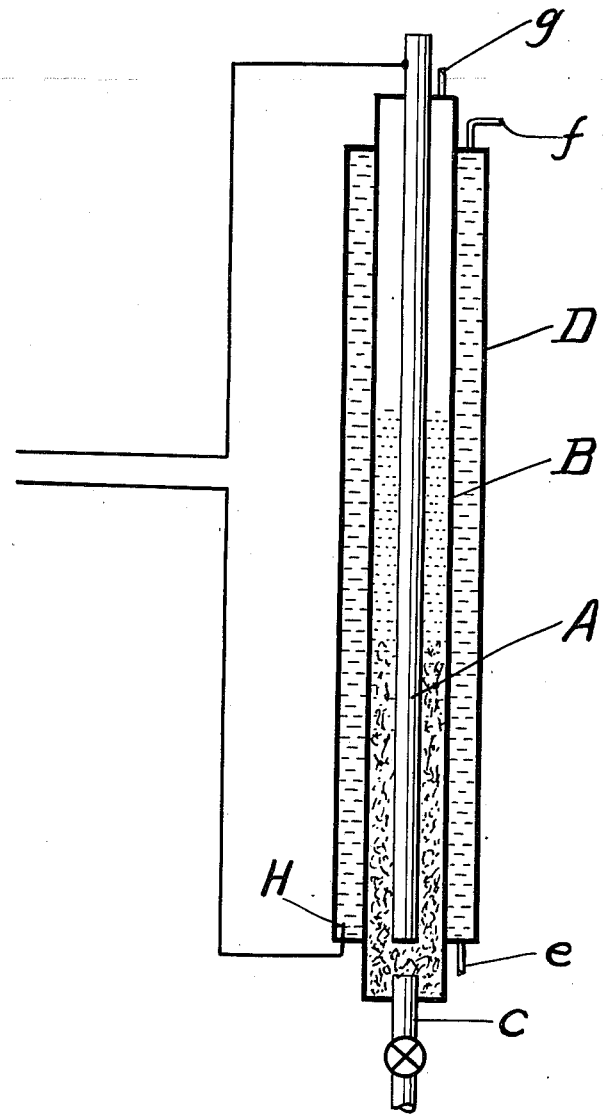
WITNESS:
INVENTOR
Lanning P. Rankin
BY
ATTORNEYS.

Patented July 6, 1937

2,086,434

UNITED STATES PATENT OFFICE 2,086,434

GLOW DISCHARGE TREATMENT OF ROSIN

Lanning P. Rankin, Norton, Kans., assignor to Hercules Powder Company, Wilmington, Del., a corporation of Delaware Application January 9, 1932, Serial No. 585,690

1 Claim. (Cl. 204—31)

This invention relates to a treatment of rosin for improvement of its viscosity and melting point and for reduction in its tendency to crystallize, etc. The treatment in accordance with this invention may be applied to any type of rosin, as wood or gum rosin, but will be found especially advantageous in the case of wood rosin.

More particularly the invention involves subjecting the rosin to an electrical discharge.

The treatment in accordance with this invention will be carried out desirably with a high voltage, high frequency alternating current and may be carried out with the use of any suitable form of apparatus, it being noted that the rosin, in a molten condition, will desirably be subjected to the discharge in thin films and desirably the electrodes by which the current is led to the rosin will be separated by a dielectric material.

Having now indicated in a general way the nature and purpose of this invention, I will proceed to a more detailed description thereof with reference to the accompanying drawing in which the single figure is a diagrammatic illustration of a form of apparatus which has been found satisfactory for carrying out the treatment.

In the drawing A represents an electrode which is of metal. B represents a tube surrounding the electrode A and desirably made of glass, or other suitable dielectric material. The tube B is closed at its top and is provided with a valved opening C at its bottom. A vent $g$ is provided at the top of tube B, or the electrode A may be of tubular form and serve as a vent. D represents a tube of glass surrounding the tube B and closed at its top and bottom. The tube B contains a quantity of molten rosin, introduced through the valved opening $c$, while the tube D contains a heating medium which will operate as an electrolyte for maintaining the rosin in a molten state. The electrolyte is circulated between tube D and a source of heat, not shown, through the inlet $e$ and outlet $f$ with which the tube is provided. H represents a connection from the source of alternating current to the electrolyte which acts as a second electrode. The electrode A is connected to a source of alternating current. In the operation of the apparatus described assuming the tube B to contain molten rosin, under atmospheric pressure, with vent $g$ open, a current is passed between the electrode A and the electrolyte in tube D, while at the same time hydrogen from a suitable source is passed into the rosin in tube B through the valved opening $c$. The hydrogen bubbles up through the rosin in tube B and carries the rosin upwards in the films on the electrode A so that it is subjected to the discharge in films on the electrode. Alternatively, the tube B may be evacuated through the vent $g$, by any suitable means and the rosin will be carried upward on the electrode A in thin films by hydrogen evolved by the discharge.

The electric current used may, for example, be one of say 6600–9000 volts and 700 cycles per second.

It will be appreciated that the apparatus above described is described by way of illustration only, since any suitable apparatus may be used in carrying out the treatment without departing from this invention.

In the treatment described the effect upon the rosin will be approximately proportioned to the time of treatment. Thus, by treatment of wood rosin grading I in color and having a melting point of 80° C. (drop method) for 3–8 hours, the melting point of the rosin will be increased to 90–130°+ with some decrease in acid number and in saponification number.

Typical examples of rosin treated in accordance with this invention in comparison with the rosin before treatment are given in the following table:

|  | FF wood rosin before treatment | FF wood rosin after treatment for 4 hours |
|---|---|---|
| A. N | 151.0 | 143.4. |
| S. N | 175.3 | 169.8. |
| M. P | 80.5° C | 85.0° C. |
| Color | 80 amber + 160 red (Lovibond scale). | 80 amber + 215 red (Lovibond scale). |

|  | I wood rosin | I wood rosin after treatment for 6 hours |
|---|---|---|
| A. N | 163.0 | 154.5. |
| S. N | 169.7 | 162.0. |
| M. P | 79.0° C | 87.0° C. |
| Color | 80 amber + 1 red (Lovibond scale). | 80 amber + 16 red (Lovibond scale). |

In carrying out the treatment described, the use of a dielectric material between the electrodes, as by forming the tube B of glass, will be found advantageous in that breakdown of the rosin will be retarded and consequently the treated rosin will not be discolored in the treatment, though the time required for given results will be increased since the dielectric will decrease the current flow for a given voltage. If desired the use of a dielectric may be dispensed with and the treated rosin subjected to distillation, or to extraction with, for example, furfural, or with a rosin solvent, as gasoline, to remove discoloration, with, however, some loss of the effect of the electrical treatment.

As a result of the treatment in accordance with this invention melting points as high as 120° C. have been obtained. The treated rosin has an increased viscosity and it has been found that the viscosity of wood rosin can be raised to that of gum rosin. The treated rosin after liming will give a more viscous solution than untreated rosin and ester gum made from the treated rosin shows an increased melting point.

The treated rosin and its solutions in organic solvents show less tendency to crystallize than does untreated rosin.

It will be understood that the method in accordance with this invention may be applied to the treatment of rosin or abietic acid esters, as, for example, glycerol abietate, glycerol diabietate, etc., as well as to rosin, and that it is intended that the claim appended hereto shall embrace within its scope the treatment of rosin or abietic acid esters as well as the treatment of rosin.

What I claim and desire to protect by Letters Patent is:

The method of treating rosin which includes subjecting rosin in a fluid condition in a film to a high voltage high frequency electrical discharge in the presence of hydrogen whereby the melting point of the rosin is increased and the tendency of the rosin to crystallize is reduced.

LANNING P. RANKIN.